(12) United States Patent
Chen et al.

(10) Patent No.: US 6,240,228 B1
(45) Date of Patent: May 29, 2001

(54) DUPLEX FIBER OPTIC CONNECTOR SYSTEM AND METHOD OF FABRICATION

(75) Inventors: Wenzong Chen, Darien; Igor Grois, Northbrook; Scot A. Ernst, Naperville, all of IL (US)

(73) Assignee: Molex Incorporated, Lisle, IL (US)

( * ) Notice: Subject to any disclaimer, the term of this patent is extended or adjusted under 35 U.S.C. 154(b) by 0 days.

(21) Appl. No.: 09/173,504

(22) Filed: Oct. 15, 1998

(51) Int. Cl.[7] ............................................... G02B 6/36
(52) U.S. Cl. ............................ 385/53; 385/71; 385/59; 385/89
(58) Field of Search .................................. 385/71.53, 75, 385/76, 78, 89, 59

(56) References Cited

U.S. PATENT DOCUMENTS

| | | |
|---|---|---|
| 5,293,581 | 3/1994 | DiMarco ............................ 385/76 |
| 5,325,454 | 6/1994 | Rittle et al. ........................ 385/76 |
| 5,343,547 | 8/1994 | Palecek et al. ..................... 375/76 |
| 5,386,487 * | 1/1995 | Briggs et al. ...................... 385/59 |
| 5,475,781 | 12/1995 | Chang et al. ...................... 385/76 |
| 5,598,495 | 1/1997 | Rittle et al. ........................ 385/75 |

* cited by examiner

Primary Examiner—Phan T. H. Palmer
(74) Attorney, Agent, or Firm—A. A. Tirva

(57) ABSTRACT

A system for maintaining a pair of fiber optic connectors in a side-by-side relation with float therebetween, along with a method of fabricating the connectors. A first connector housing receives a first optical fiber plug, and includes a first latch molded integrally therewith. A second connector housing receives a second optical fiber plug and includes a second latch molded integrally therewith. The first and second latches are permanently and non-releasably molded in loose engagement to hold the connector housings in a side-by-side relationship with float therebetween.

11 Claims, 5 Drawing Sheets

DUPLEX FIBER OPTIC CONNECTOR SYSTEM AND METHOD OF FABRICATION

FIELD OF THE INVENTION

This invention generally relates to the art of fiber optic connectors and, particularly, to a system for interconnecting a pair of individual fiber optic connectors, along with a method of fabricating the connectors.

BACKGROUND OF THE INVENTION

Fiber optic devices use single or multiple strands of fibers each having an inner circular glass core coated with a circumferential cladding having a different index of refraction. Light is transmitted along the core and reflected from the interface between the core and cladding. Such devices can be used as transmission lines for transmitting information bearing light energy. A transmission line can be formed from a single fiber or it can include a plurality of fibers bundled together. Additionally, several transmission lines can be arranged in parallel for the simultaneous transmission of information along each of the separate lines.

Originally, fiber optic systems utilized simplex interconnection systems with single connector plugs terminating single fiber optic cables. In a simplex system, either transmission or reception of information can take place at one time. Consequently, simplex systems are limited in the amount of information that they can transmit and receive during a given period of time.

To increase the amount of information that can be communicated over fiber optic systems, multi-channel systems were developed. Such multi-channel systems include, for example, duplex connector plugs and cables which are capable of simultaneous transmission and reception. Thus, using a duplex system enables information to be transmitted at a much higher rate.

In order to manage the duplex connector plugs and cables, structures have been designed for interconnecting two fiber optic connectors in a side-by-side relationship forming a duplex connector. For instance, adapter structures have been designed to provide a pair of side-by-side through receptacles for receiving the pair of fiber optic connectors in a side-by-side arrangement. Not only do such duplex adapters increase costs by requiring an additional, somewhat bulky component, but it also is difficult to maintain proper axial alignment which is necessary for optimum signal transmission. Misalignment in such duplex connectors or adapters are caused by manufacturing inaccuracies or tolerances. Consequently, interconnection systems, adapters or the like have been designed for mounting a pair of fiber optic connectors in a side-by-side alignment with lateral floating therebetween generally perpendicular to their longitudinal axes in order to compensate for misalignment due to manufacturing tolerances and the like. These systems may be provided directly between the connector housings. The present invention is directed to providing improvements in such a floating system directly between a pair of side-by-side fiber optic connectors and which also eliminates separate floating mechanisms in interconnecting adapters or the like.

SUMMARY OF THE INVENTION

An object, therefore, of the invention is to provide a new and improved system for maintaining a pair of fiber optic connectors in a side-by-side relation with float therebetween, along with a method of fabricating the connectors.

In the exemplary embodiment of the invention, a first connector housing is provided for receiving a first optical fiber plug. The first housing includes a first latch molded integrally therewith. A second connector housing is provided for receiving a second optical fiber plug. The second housing includes a second latch molded integrally therewith. The first and second latches are permanently and non-releasably molded in loose interengagement to hold the connector housings in a side-by-side relationship with float therebetween.

As disclosed herein, the first and second latches comprise complementarily loosely engaged retention arms. The retention arms comprise permanently interengaged hooked arms. A plurality of pairs of the first and second retention arms are located at spaced locations between the connector housings.

The invention also contemplates a method in which the connector housings are interconnected by the permanently molded, interengaging latches or retention arms.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the advantages thereof, may best understood by reference to the following description taken in conjunction with the accompanying drawings, in which like reference numerals identify like elements in the figures and in which:

DETAILED DESCRIPTION OF THE PREFERRED EMBODIMENT

Figure 1:
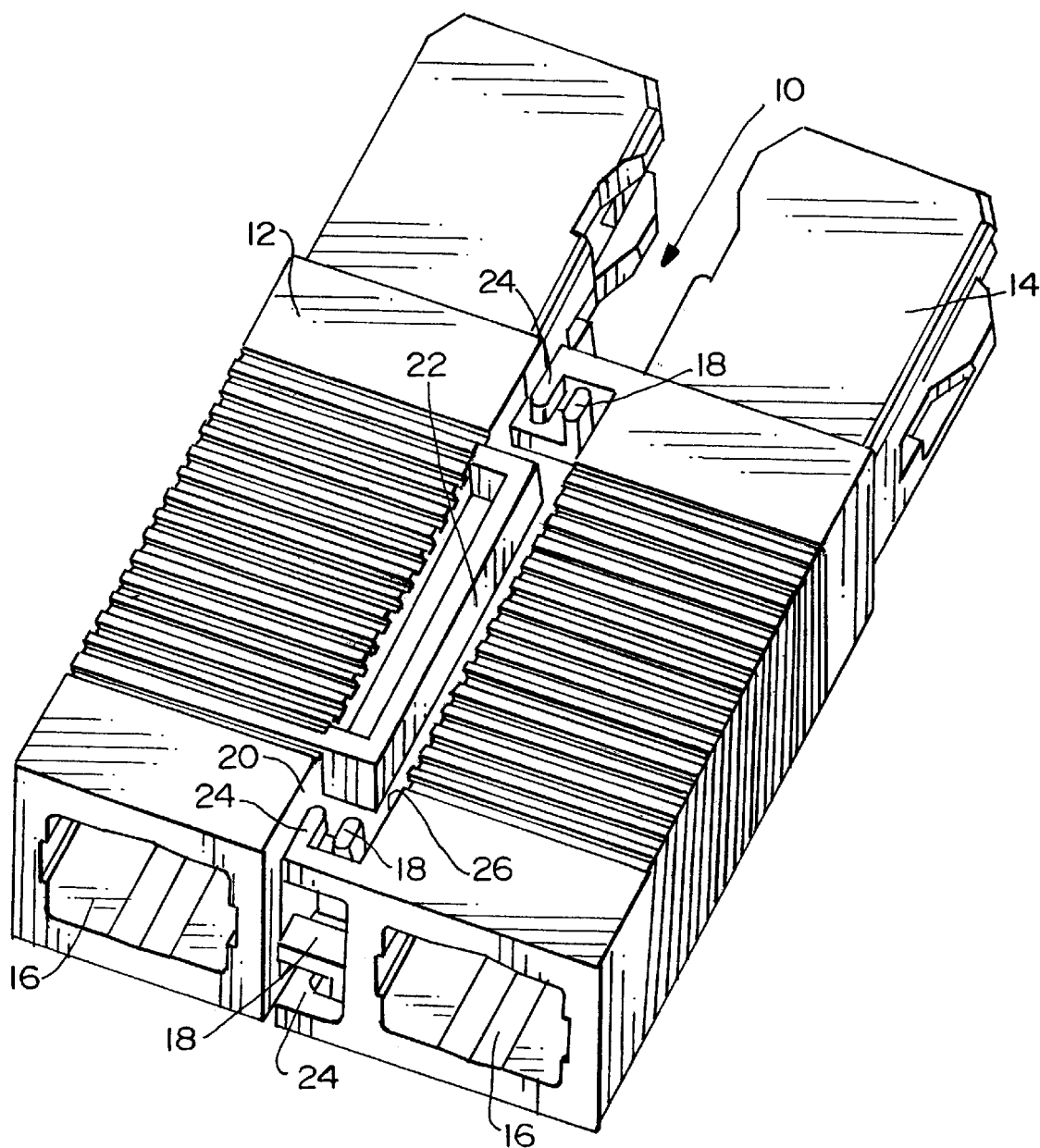
FIG. 1 is a perspective view of a pair of connector housings permanently interengaged by the duplex interconnection system of the invention.

Referring to the drawings in greater detail, and first to FIG. 1, the invention is embodied in a duplex interconnection system, generally designated 10, for permanently interconnecting first and second fiber optic connector housings 12 and 14 in loose engagement to provide floating movement between the housings. The housings are of the well known "SC" type for receiving appropriate optical fiber plugs within through receptacles 16. "SC" type fiber optic connectors are well known in the art and the optical fiber plugs are not shown herein. However, it should be understood that the duplex interconnection system of the invention is not limited to just "SC" type connectors.

Figure 2:
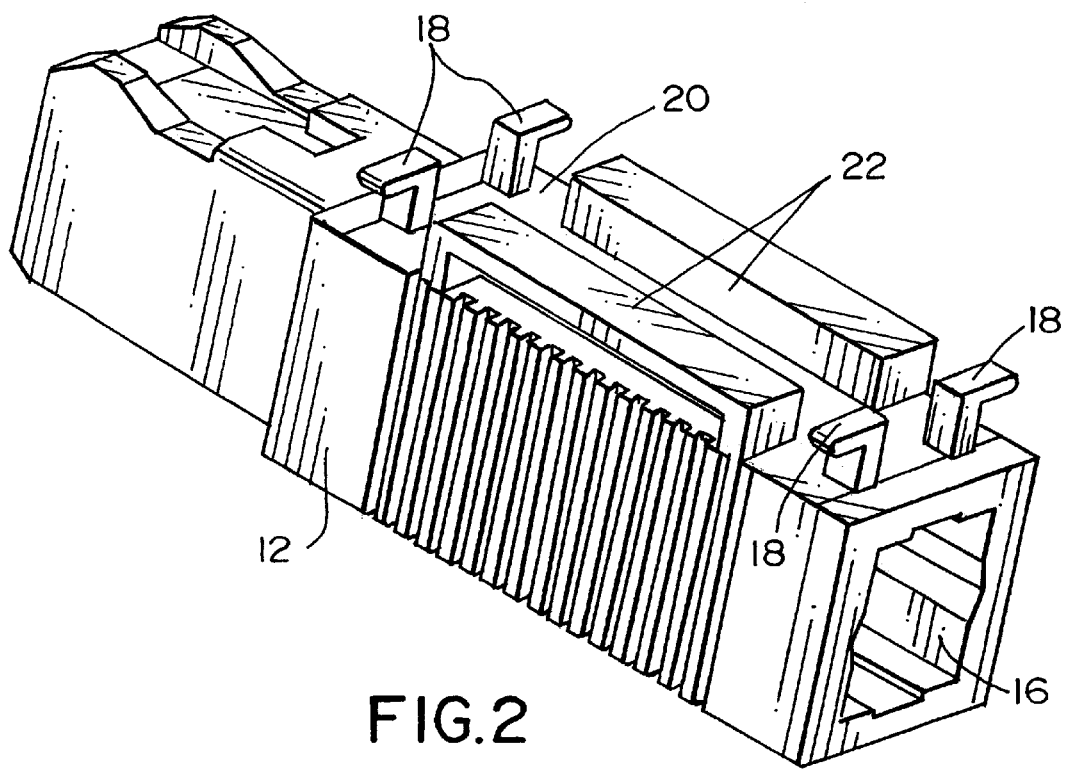
FIG. 2 is a perspective view of one of the connector housings, although this isolated depiction of the housing could not occur in actual practice.

Referring to FIG. 2 in conjunction with FIG. 1, first connector housing 12 is a one-piece structure unitarily molded of dielectric material such as plastic or the like. The housing has four latches in the form of hooked retention arms 18 molded integrally therewith and projecting inwardly from an inner face 20 thereof. In essence, the hooked retention arms are located at the corners of an elongated rectangular interface between the connector housings. It can be seen that the hooked arms are directed radially outwardly in a direction transverse to the longitudinal axis of the connector housing. A pair of elongated ribs 22 are molded integrally with the housing between the opposite pairs of hooked retention arms and project radially inwardly from inner face 20. These ribs are for aesthetic purposes, but the ribs also function to prevent an operator's fingers from projecting between the two connector housings.

Figure 3:
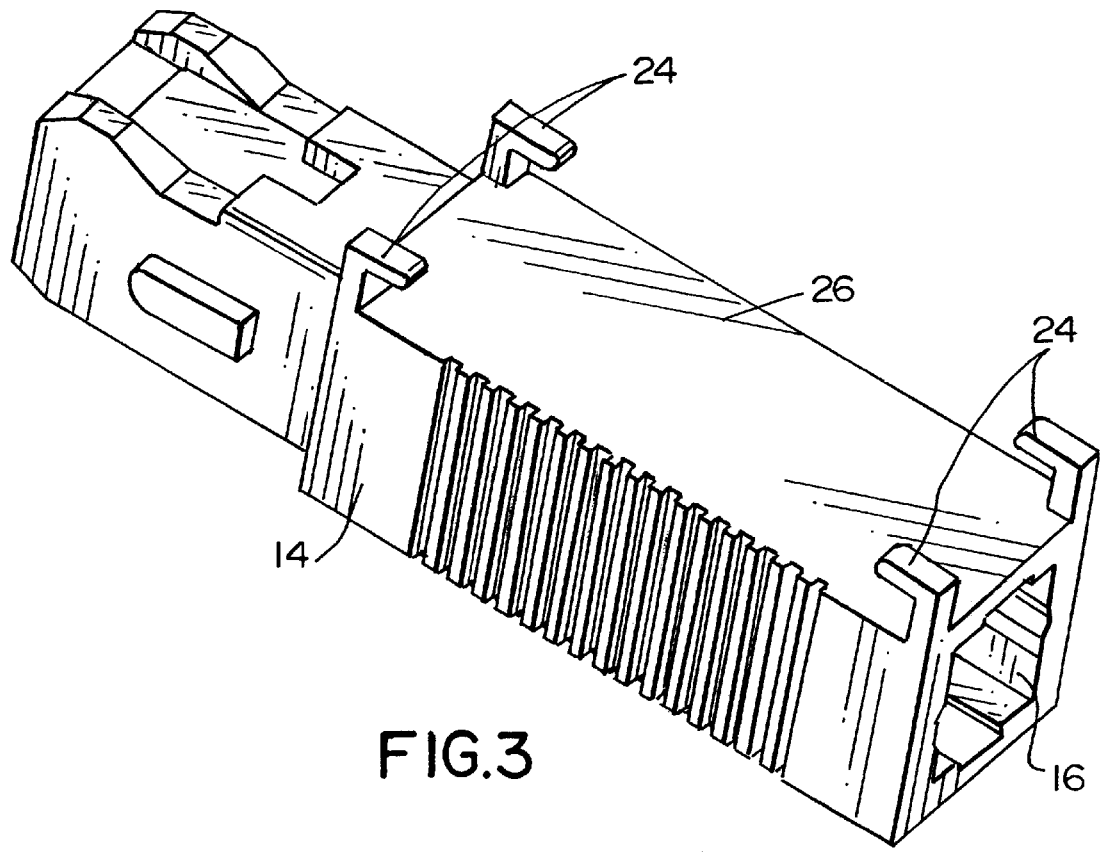
FIG. 3 is a perspective view of the other connector housing, although this isolated depiction could not happen in actual practice.

Referring to FIG. 3 in conjunction with 1, second fiber optic connector housing 14 also has four latches in the form of generally "rectangularly" spaced, hooked retention arms 24 projecting inwardly from an inside face 26 of the housing. The second connector housing is a one-piece structure unitarily molded of dielectric material such as plastic or the like, and retention arms 24 are molded integrally therewith. It can be seen that the hooked retention arms are directed longitudinally of the elongated connector housing.

It should be understood that first and second connector housings 12 and 14, respectively, cannot be separated from each other as shown in the isolated depictions of FIGS. 2 and 3. These depictions are used herein simply to provide a better illustration of the configuration and spacing of the latches or hooked retention arms 18 and 24 between the two housings. The hooked retention arms are permanently and non-releasably molded in loose interengagement as shown in FIG. 1 and as described hereinafter, and the housings cannot be disengaged after molding.

Specifically, referring back to FIG. 1, it can be seen that the transversely directed hooked retention arms 18 of first connector housing 12 are loosely interengaged behind the longitudinally directed hooked retention arms 24 of second connector housing 14. It also can be seen that the lengths of the hooked arms and the thickness of the hooks on the ends of the arms are such as to provide a significant amount of lost motion or float between the interengaged retention arms and, consequently, between the two connector housings, and prevents the two housings from becoming disengaged. With the two housings being in permanent interengagement, subsequent assembly steps are totally eliminated. This also reduces the problem of maintaining separate inventories for separate parts.

FIGS. 4–7 show a mold assembly, generally designated 30 (FIGS. 4 and 5), for molding fiber optic connector housings 12 and 14 with hooked retention arms 18 and 24 in permanent but loose interengagement. The mold assembly includes a pair of major side molds 50, a pair of minor side molds 52, an end mold 54 and a core mold 56. Major side molds 50 are movable toward and away from assembled condition in the direction of arrows "A". Minor side molds 52 are movable toward and away from assembled condition in the direction of arrows "B". End mold 54 is movable toward and away from assembled condition in the direction arrow "C". Core mold 56 is movable toward and away from assembled condition in the direction of arrow "D".

Core mold 56 includes a pair of plug portions 58 which are effective to form through receptacles 16 within the connector housings. A center partition 60 of the core mold cooperates with a plug portion 62 of end mold 54 to effectively form the gap or spacing between connector housings 12 and 14, as well as laterally between elongated ribs 22 and the side pairs of interengaged hooked retention arms 18 and 24. Major side molds 50 are identical in construction and have major elongated cavities 64 which form the outside configuration of connector housings 12 and 14.

Finally, minor side molds 52 are identical in construction and include ribs 66 which are effective to form side ribs 22 on connector housing 12. The minor side molds have multiple boss arrangements 68 which are effective to form the loosely interengaged hooked retention arms 18 and 24 at one end of the interconnected housings (the left-hand end as viewed in FIG. 6). The minor side molds also have boss arrangements 70 which are effective to form the loosely interengaged hooked retention arms 18 and 24 located more centrally of the interengaged housings. Boss arrangements 68 close onto shut-off surface arrangements 76 on core mold 56, and boss arrangements 70 close onto surface arrangements 78 on end mold 54. In essence, two separate cavities are formed for the two housings. Other portions, such as bosses 72, on the opposite ends of minor side molds 52 are effective to form the specific configuration of the noses 74 of the connector housings, such as notches 76.

Figure 4:
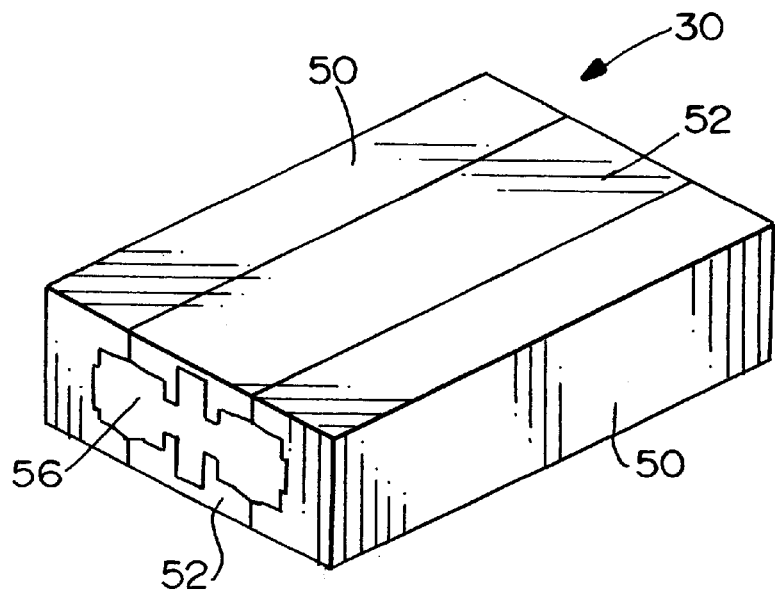
FIGS. 4 and 5 are perspective views of a mold assembly for molding the connector housings in permanent interengagement, the views looking at opposite ends of the mold assembly.
Figure 5:
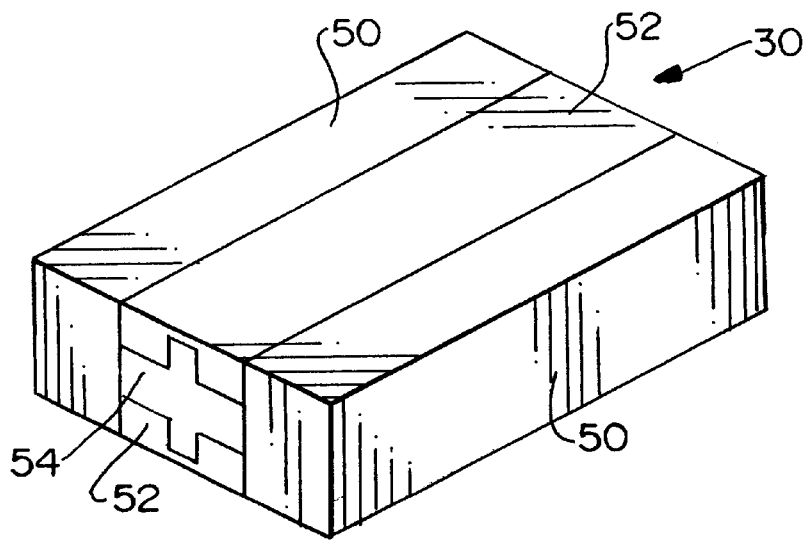
Figure 6:
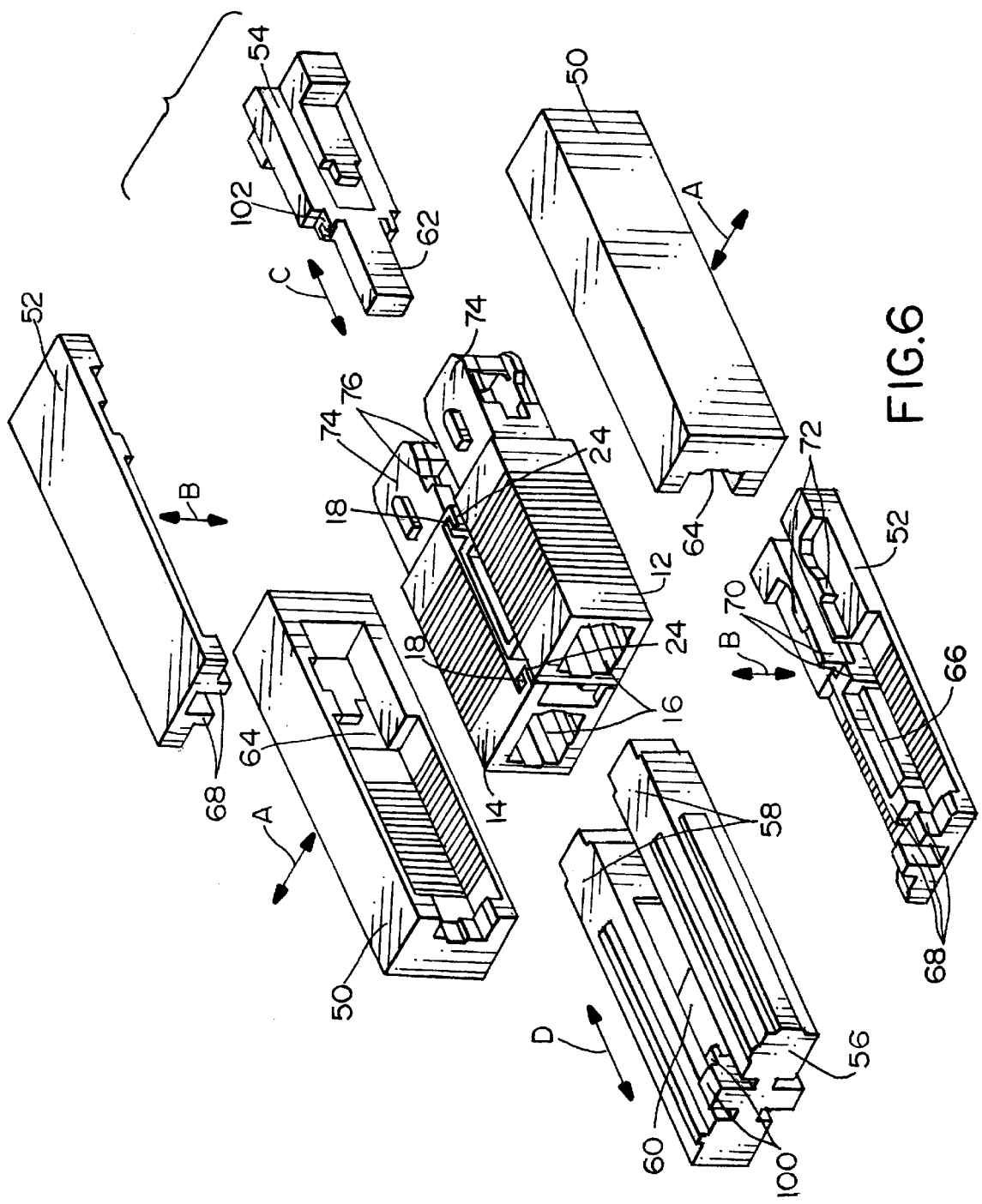
FIGS. 6 and 7 are exploded perspective views of the components of the mold assembly surrounding the interengaged connector housings.
Figure 7:
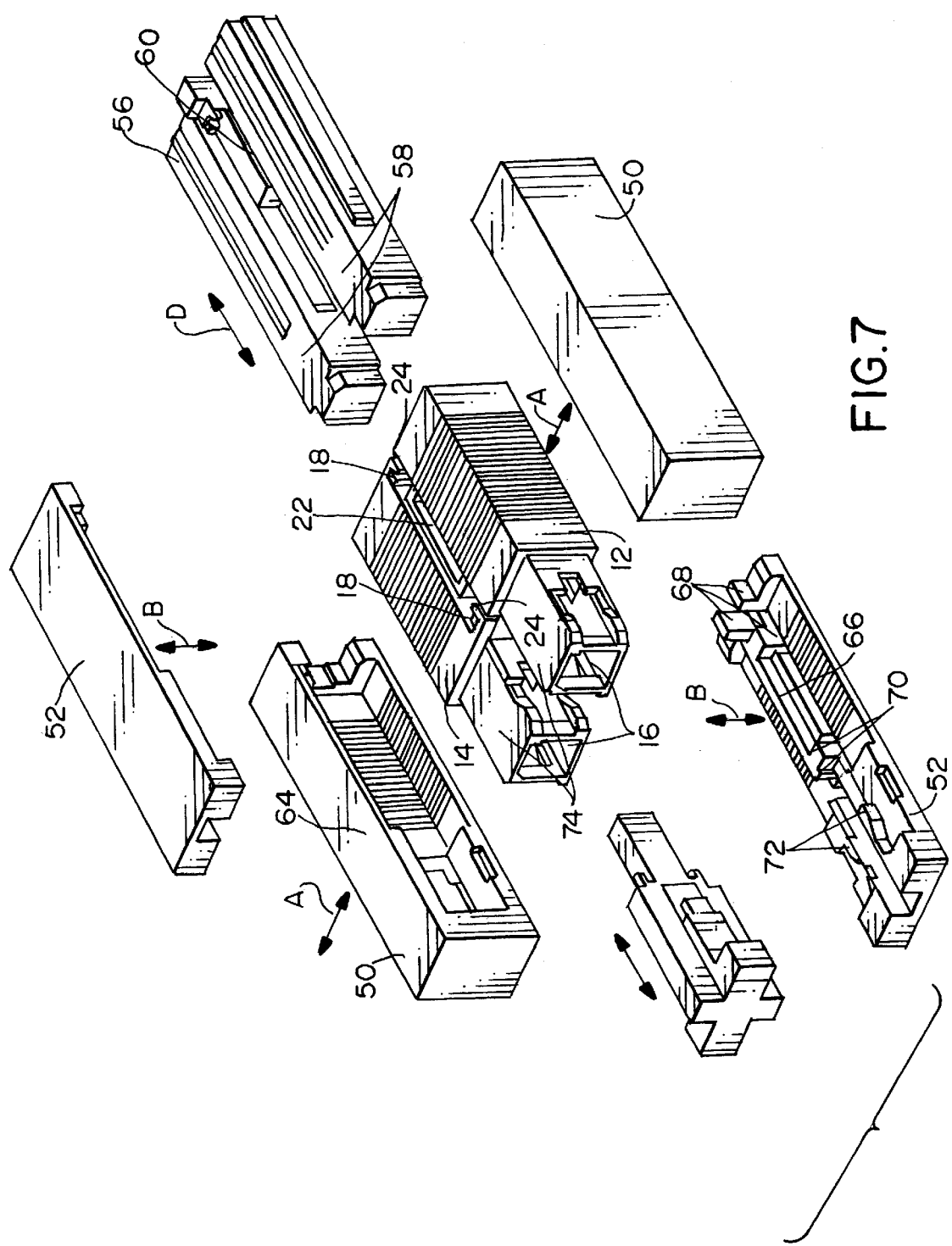

When side molds 50 and 52, end mold 54 and core mold 56 as shown in FIGS. 6 and 7 are closed to form the mold assembly 30 shown in FIGS. 4 and 5, molten dielectric or plastic material is injected through two distinct gates into the two cavities formed by the various mold components to mold connector housings 12 and 14 with hooked retention arms 18 and 24 in permanent but loose interengagement as shown in FIG. 1. The invention includes molding this duplex interconnection system by such techniques and by such a molding apparatus or its equivalent.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

We claim:

1. A system for maintaining a pair of fiber optic connectors in a side-by-side relation with float therebetween, comprising:

a first connector housing for receiving a first optical fiber plug, and including a first latch molded integrally with the first connector housing; and a second connector housing for receiving a second optical fiber plug, and including a second latch molded integrally with the second connector housing, and the second latch being permanently and non-releasably molded in loose engagement with the first latch to hold the connector housings inseparably in a side-by-side relationship with float therebetween.

2. The system of claim 1 wherein said first and second latches comprise complementarily loosely interengaged retention arms.

3. The system of claim 2 wherein said retention arms comprise permanently interengaged hooked arms.

4. The system of claim 2, including a plurality of pairs of said interengaged retention arms at spaced locations between the connector housings.

5. The system of claim 4 wherein said retention arms comprise permanently interengaged hooked arms.

6. The system of claim 4, including four pairs of said first and second retention arms located generally at four corners of generally rectangular opposing faces of the first second connector housings.

7. A method of fabricating a pair of fiber optic connectors in a side-by-side relation with float therebetween, comprising the steps of:
   molding a first connector housing with a receptacle for receiving a first optical fiber plug and with a first latch molded integrally therewith; and
   molding a second connector housing with a receptacle for receiving a second optical fiber plug and with a second latch molded integrally therewith, the second latch being permanently and non-releasably molded in loose engagement with the first latch for holding the connector housings inseparably in a side-by-side relationship with float therebetween.

8. The method of claim 7, including molding said first and second latches in the form of complementarily loosely interengaged retention arms.

9. The method of claim 8, including molding said retention arms as permanently interengaged hooked arms.

10. The method of claim 8, including molding a plurality of pairs of said interengaged retention arms at spaced locations between the connector housings.

11. The method of claim 7 wherein said first and second connector housings, including their respective first and second latches, are simultaneously molded in a single mold assembly.

* * * * *